US012664017B2

(12) United States Patent
Segger

(10) Patent No.: US 12,664,017 B2
(45) Date of Patent: Jun. 23, 2026

(54) REAL-TIME OPERATING SYSTEM WITH A CPU CYCLE TIME BASE

(71) Applicant: Rolf Segger, Nassau (BS)

(72) Inventor: Rolf Segger, Nassau (BS)

( * ) Notice: Subject to any disclaimer, the term of this patent is extended or adjusted under 35 U.S.C. 154(b) by 532 days.

(21) Appl. No.: 17/887,252

(22) Filed: Aug. 12, 2022

(65) Prior Publication Data

US 2023/0130826 A1 Apr. 27, 2023

Related U.S. Application Data

(60) Provisional application No. 63/271,037, filed on Oct. 22, 2021.

(51) Int. Cl.
| | |
|---|---|
| *G06F 3/00* | (2006.01) |
| *G06F 9/48* | (2006.01) |
| *G06F 9/54* | (2006.01) |

(52) U.S. Cl.
CPC ............ *G06F 9/4881* (2013.01); *G06F 9/541* (2013.01)

(58) Field of Classification Search
CPC ....................................................... G06F 9/48
See application file for complete search history.

(56) References Cited

U.S. PATENT DOCUMENTS

| | | | | |
|---|---|---|---|---|
| 4,998,291 A | * | 3/1991 | Marui | H04M 1/665 |
| | | | | 455/565 |
| 6,202,209 B1 | * | 3/2001 | Bartholomew | G06F 8/60 |
| | | | | 375/220 |

| | | | | |
|---|---|---|---|---|
| 6,209,011 B1 | * | 3/2001 | Vong | G06F 1/1684 |
| | | | | 708/135 |
| 6,453,181 B1 | * | 9/2002 | Challa | H04W 52/029 |
| | | | | 455/574 |
| 7,890,569 B1 | * | 2/2011 | Stahl | H04L 67/535 |
| | | | | 709/202 |

(Continued)

FOREIGN PATENT DOCUMENTS

| | | | | |
|---|---|---|---|---|
| DE | 102013217995 B4 | * | 11/2019 | .......... G06F 9/4881 |
| EP | 3537293 | | 9/2019 | |

(Continued)

OTHER PUBLICATIONS

Kevin Klues, Integrating Concurrency Control and Energy Management in Device Drivers. (Year: 2007).*

(Continued)

*Primary Examiner* — Lechi Truong
(74) *Attorney, Agent, or Firm* — Knobbe, Martens, Olson & Bear, LLP

(57) ABSTRACT

An improved real-time operating system (RTOS) design that uses cycle-based scheduling rather than tick-based scheduling is described herein. Using cycle-based scheduling, versus the traditional tick-based scheduling, provides technical benefits to embedded systems. For example, the cycle-based scheduling can change the basic unit of time of the embedded system by increasing the resolution of scheduling. Instead of relying on the system tick used in typical RTOS implementations (e.g., a tick that occurs every 1 millisecond), the improved RTOS design described herein uses CPU cycles internally for some or all operations. Operations such as task delays, timeouts, and/or software timers, which were specified in units of system ticks in typical RTOS implementations, can now be specified in CPU cycles.

21 Claims, 3 Drawing Sheets

*300*

302 — BEGIN CYCLE-BASED SCHEDULING ROUTINE

304 — CAUSE A FIRST HARDWARE TIMER TO INCREMENT A CYCLE COUNT VALUE EACH CPU CYCLE

306 — OBTAIN AN API FUNCTION CALL FROM A TASK

308 — SET A SECOND HARDWARE TIMER TO INCREMENT OR DECREMENT A COUNT VALUE EACH CPU CYCLE

310 — GENERATE AN INTERRUPT IN RESPONSE TO THE SECOND HARDWARE TIMER EXPIRING

312 — AWAKEN THE TASK IN RESPONSE TO A DETERMINATION THAT A TIMEFRAME SPECIFIED BY THE API FUNCTION CALL HAS PASSED

314 — FINISH CYCLE-BASED SCHEDULING ROUTINE

(56) References Cited

U.S. PATENT DOCUMENTS

| | | | | |
|---|---|---|---|---|
| 9,128,749 | B1 * | 9/2015 | Wang | G06F 9/541 |
| 2004/0123297 | A1 * | 6/2004 | Flautner | G06F 1/3203 |
| | | | | 718/102 |
| 2005/0050515 | A1 * | 3/2005 | Shah | G06F 11/323 |
| | | | | 714/E11.181 |
| 2005/0182976 | A1 * | 8/2005 | Berkes | G06F 1/329 |
| | | | | 713/300 |
| 2008/0104604 | A1 * | 5/2008 | Li | G06F 9/526 |
| | | | | 718/104 |
| 2009/0102672 | A1 * | 4/2009 | Petek | G08B 29/181 |
| | | | | 340/636.15 |
| 2010/0091643 | A1 * | 4/2010 | Tu | H04W 48/16 |
| | | | | 370/242 |
| 2012/0072844 | A1 * | 3/2012 | Lefrancois des Courtis | G06Q 30/02 |
| | | | | 709/204 |
| 2013/0091241 | A1 * | 4/2013 | Goetz | H04L 67/61 |
| | | | | 709/217 |
| 2013/0257716 | A1 * | 10/2013 | Xin | G06F 1/3215 |
| | | | | 345/156 |
| 2014/0257821 | A1 * | 9/2014 | Adams | G10L 21/06 |
| | | | | 704/275 |
| 2014/0273867 | A1 * | 9/2014 | Lamb | H04M 1/72415 |
| | | | | 455/67.11 |
| 2014/0317631 | A1 * | 10/2014 | Ryshakov | G06F 9/5016 |
| | | | | 718/103 |
| 2014/0354659 | A1 * | 12/2014 | Apodaca | G06F 1/329 |
| | | | | 345/522 |
| 2015/0003311 | A1 * | 1/2015 | Feuersaenger | H04W 52/0225 |
| | | | | 370/311 |
| 2015/0293788 | A1 * | 10/2015 | Pires Dos Reis Moreira | G06F 9/4893 |
| | | | | 718/102 |
| 2016/0360382 | A1 * | 12/2016 | Gross | H04W 4/029 |
| 2020/0133328 | A1 * | 4/2020 | Chen | G06F 1/329 |
| 2022/0134052 | A1 * | 5/2022 | Luo | A61B 5/4815 |
| | | | | 600/27 |
| 2023/0244621 | A1 * | 8/2023 | Evans | G06F 9/4893 |
| | | | | 710/52 |

FOREIGN PATENT DOCUMENTS

| | | |
|---|---|---|
| JP | 2000-47880 | 2/2000 |
| JP | 2004-164664 | 6/2004 |
| JP | 2004-32159 | 8/2005 |
| JP | 2009-271715 | 11/2009 |
| JP | 2010-3153 | 5/2013 |
| JP | 2021-152802 | 9/2021 |
| WO | WO 2021/035187 | 2/2021 |

OTHER PUBLICATIONS

Fast Interrupt Handling Scheme By Using Interrupt Wake-Up MechanismRyo Wada. (Year: 2019).*

Muneki Ikeda, Hippocampal spine changes across the sleep-wake cycle: corticosterone and kinases. (Year: 2015).*

International Search Report and Written Opinion for International Application No. PCT/US2022/040500, Notification mailed Dec. 16, 2022.

Chandrasekaran et al., A Multi-Core Version of FreeRTOS Verified for Datarace and Deadlock Freedom, 2014 Twelfth ACM/IEEE Conference on Formal Methods and Models for Codesign (Memocode), IEEE, pp. 62-71, Oct. 14, 2014.

* cited by examiner

100

EMBEDDED SYSTEM
120

MEMORY
123

REAL TIME
PROGRAM(S)
124

HARDWARE
TIMER
121

COUNTER
122

CPU
125

(OTHER HARDWARE)
126

NETWORK
110

*300*

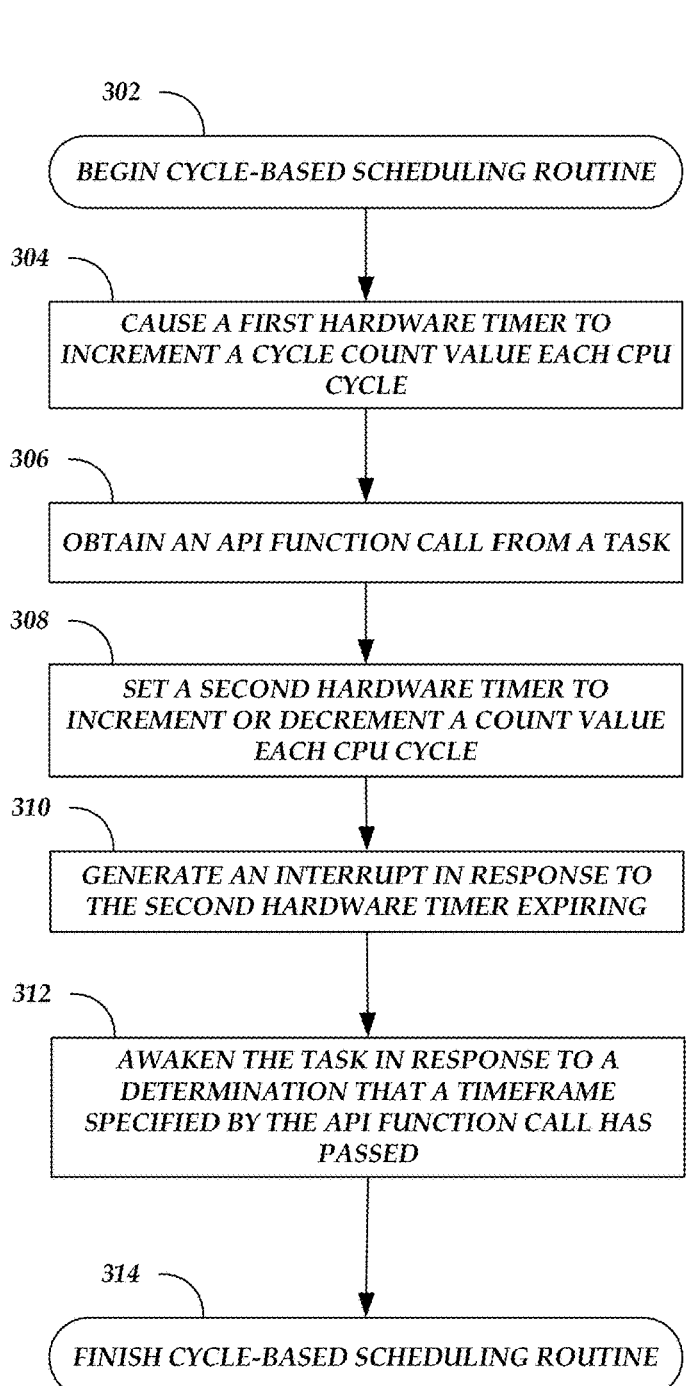

302

BEGIN CYCLE-BASED SCHEDULING ROUTINE

304

CAUSE A FIRST HARDWARE TIMER TO INCREMENT A CYCLE COUNT VALUE EACH CPU CYCLE

306

OBTAIN AN API FUNCTION CALL FROM A TASK

308

SET A SECOND HARDWARE TIMER TO INCREMENT OR DECREMENT A COUNT VALUE EACH CPU CYCLE

310

GENERATE AN INTERRUPT IN RESPONSE TO THE SECOND HARDWARE TIMER EXPIRING

312

AWAKEN THE TASK IN RESPONSE TO A DETERMINATION THAT A TIMEFRAME SPECIFIED BY THE API FUNCTION CALL HAS PASSED

314

FINISH CYCLE-BASED SCHEDULING ROUTINE

*Fig. 3*

REAL-TIME OPERATING SYSTEM WITH A CPU CYCLE TIME BASE

CROSS-REFERENCE TO RELATED APPLICATIONS

This application claims the benefit of U.S. Provisional Application No. 63/271,037, filed Oct. 22, 2021, entitled "REAL-TIME OPERATING SYSTEM WITH A CPU CYCLE TIME BASE," the disclosure of which is hereby incorporated by reference herein in its entirety.

COPYRIGHT NOTICE

BACKGROUND

An embedded computing system (or embedded system) may include an electrical system controlled by one or more processors or central processing units (CPUs), as well as memory and input/output (I/O) units. Examples of embedded systems include: household (whiteware) appliances, such as microwaves, dishwashers, ovens, and refrigerators; telecommunication systems such as cordless phones, cell phones, and telephone base stations; automotive systems such as antilock brake systems and engine control systems; entertainment systems such as portable audio players, movie players, and portable gaming devices; industrial systems that include industrial controls; measurement devices; medical devices; and the like.

The software or firmware for these embedded devices can be quite complex. For example, these embedded devices may run a real-time operating system (RTOS), which allows for the execution of multiple tasks on a single central processing unit (CPU) core of a microcontroller.

SUMMARY

One aspect of the disclosure provides a computing device comprising a memory device configured to store an operating system. The computing device further comprises a hardware processor in communication with the memory device, wherein the hardware processor is configured with computer-executable instructions that, when executed by the hardware processor, cause the hardware processor to: cause a first hardware timer to increment a cycle count value each cycle of the hardware processor; determine that a task running on the hardware processor has called an application programming interface (API) function that specifies a timeframe; in response to the API function being called, set a second hardware timer to change a count value each cycle of the hardware processor; determine that the second hardware timer has expired; cause the second hardware timer to generate an interrupt; determine that the timeframe specified by the API function has passed using a current version of the cycle count value; and awaken the task.

The computing device of the preceding paragraph can include any sub-combination of the following features: where the computer-executable instructions, when executed, further cause the hardware processor to determine that the count value has reached one of zero or a value corresponding to the timeframe; the timeframe comprises one of a number of cycles of the hardware processor, a unit of time, or a unit of system tick; the computer-executable instructions, when executed, further cause the hardware processor to set the second hardware timer to increment the count value each cycle of the hardware processor; the computer-executable instructions, when executed, further cause the hardware processor to set the second hardware timer to decrement the count value each cycle of the hardware processor; the operating system comprises a real-time operating system; where the computing device comprises an embedded system; where the operating system is compatible with an extended API, wherein the extended API comprises at least one of a first function, a second function, or a third function, wherein the first function, when called, passes a first parameter to the operating system in which a unit of ticks is specified and that directs the operating system to schedule the interrupt to trigger after a first number of cycles of the hardware processor corresponding to the first parameter has passed, wherein the second function, when called, passes a second parameter to the operating system in which a second number of cycles of the hardware processor is specified and that directs the operating system to schedule the interrupt to trigger after the second number of cycles of the hardware processor has passed, and wherein the third function, when called, passes a third parameter to the operating system in which a unit of time is specified and that directs the operating system to schedule the interrupt to trigger after a third number of cycles of the hardware processor corresponding to the third parameter has passed; where the unit of time comprises one of milliseconds, microseconds, or nanoseconds; and where the first hardware timer is used for long-term time measurement, and wherein the second hardware timer is a one-shot timer.

Another aspect of the disclosure provides a computer-implemented method comprising: causing a first hardware timer to increment a cycle count value each cycle of a hardware processor; determining that a task running on the hardware processor has called an application programming interface (API) function that specifies a timeframe; in response to the API function being called, setting a second hardware timer to change a count value each cycle of the hardware processor; determining that the second hardware timer has expired; causing the second hardware timer to generate an interrupt; determining that the timeframe specified by the API function has passed using a current version of the cycle count value; and awakening the task, where the computer-implemented method is performed by an operating system executed by the hardware processor.

The computer-implemented method of the preceding paragraph can include any sub-combination of the following features: where determining that the second hardware timer has expired further comprises determining that the count value has reached one of zero or a value corresponding to the timeframe; where the timeframe comprises one of a number of cycles of the hardware processor, a unit of time, or a unit of system tick; where setting a second hardware timer further comprises setting the second hardware timer to increment the count value each cycle of the hardware processor; where setting a second hardware timer further comprises setting the second hardware timer to decrement the count value each cycle of the hardware processor; where the operating system comprises a real-time operating system; where an embedded system comprises the hardware processor; where the operating system is compatible with an extended API, wherein the extended API comprises at least one of a first function, a second function, or a third function, wherein the first function, when called, passes a first parameter to the operating system in which a unit of ticks is specified and that directs the operating system to schedule the interrupt to trigger after a first number of cycles of the hardware processor corresponding to the first parameter has passed, wherein the second function, when called, passes a second parameter to the operating system in which a second number of cycles of the hardware processor is specified and that directs the operating system to schedule the interrupt to trigger after the second number of cycles of the hardware processor has passed, and wherein the third function, when called, passes a third parameter to the operating system in which a unit of time is specified and that directs the operating system to schedule the interrupt to trigger after a third number of cycles of the hardware processor corresponding to the third parameter has passed; where the unit of time comprises one of milliseconds, microseconds, or nanoseconds; and where the first hardware timer is used for long-term time measurement, and wherein the second hardware timer is a one-shot timer.

For purposes of summarizing the disclosure, certain aspects, advantages and novel features of several embodiments are described herein. It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

BRIEF DESCRIPTION OF THE DRAWINGS

The features disclosed herein are described below with reference to the drawings. The drawings are provided to illustrate embodiments of the inventions described herein and not to limit the scope thereof.

FIG. 3 illustrates an example cycle-based scheduling routine that can be implemented by the embedded system of FIG. 1.

DETAILED DESCRIPTION

Figure 1:
FIG. 1 illustrates an example operational environment that includes an embedded system that runs an RTOS implementation with cycle-based scheduling.
Figure 1:
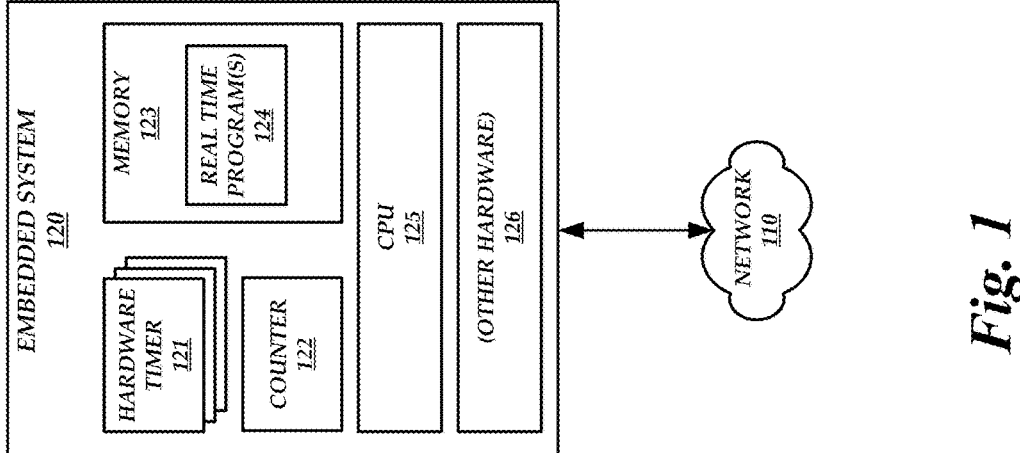

As explained above, embedded devices may run an RTOS, which allows for the execution of multiple tasks on a single CPU core of a microcontroller. Typical RTOS implementations use a system tick, which is used as a time base (e.g., a basic unit of time). Generally, a typical RTOS implementation uses a hardware timer to generate periodic system tick interrupts, and all RTOS timeouts, task delays, and/or periods are specified in terms of system tick rather than time (e.g., milliseconds). In other words, timeouts, task delays, and/or periods in typical RTOS implementations are aligned to the system tick such that timeouts, task delays, and/or periods occur in integer multiples of system ticks. The system tick is user-configurable, but is typically set to 1 millisecond in typical RTOS implementations. By setting the system tick to 1 millisecond, the hardware timer is programmed to generate a system tick interrupt 1000 times per second in typical RTOS implementations.

However, a system tick interrupt that occurs every 1 millisecond may be inadequate to perform operations that may be requested by modern embedded systems. For example, because task delays and/or timeouts are aligned to the system tick, a task delay and/or timeout cannot expire during the time between two system tick interrupts. Thus, it may not be possible to configure a task delay that has a delay for a time period that is shorter than the time period between consecutive system tick interrupts in typical RTOS implementations.

In addition, a system tick interrupt that occurs every 1 millisecond (or any other time period) can result in wasted computational resources and/or excess power consumption. For example, if the CPU core is only executing one task for several consecutive system ticks, then the scheduler is not executed during this time and therefore interrupts that trigger the scheduler are not needed. However, typical RTOS implementations have no mechanism for tracking task execution and adjusting system tick interrupts accordingly. Rather, the hardware timer will continue to generate system tick interrupts and activate the scheduler regardless of the state of task execution, thereby wasting computational resources and/or consuming excess power.

Accordingly, described herein is an improved RTOS implementation that uses cycle-based scheduling rather than tick-based scheduling. Using cycle-based scheduling, versus the traditional tick-based scheduling, provides technical benefits to embedded systems as described in greater detail below. While the improved RTOS implementation described herein uses cycle-based scheduling instead of tick-based scheduling, the improved RTOS implementation described herein may still be compatible with application programming interface (API) functions that exist in traditional RTOS implementations (e.g., the improved RTOS described herein can read and execute API functions that exist in traditional RTOS implementations). By remaining compatible with traditional RTOS API functions, the improved RTOS implementation described herein allows existing code to keep the same timing (e.g., integer multiples of system ticks, usually milliseconds) and therefore the existing code can remain unchanged. The improved RTOS implementation described herein can also implement additional API functions to support the cycle-based scheduling described below.

For example, the cycle-based scheduling described herein can change the basic unit of time of the embedded system by increasing the resolution of scheduling. Instead of relying on the system tick used in typical RTOS implementations (e.g., a tick that occurs every 1 millisecond), the improved RTOS implementation described herein uses CPU cycles internally for some or all operations. Operations such as task delays, timeouts, and/or software timers, which were specified in units (e.g., multiples) of ticks (e.g., milliseconds) in typical RTOS implementations, can now be specified in CPU cycles (e.g., the internal unit of the embedded system). Operations can also be specified in system-independent, high-resolution units, such as microseconds, nanoseconds, etc., as well as in the traditional tick or milliseconds units. As used herein, a CPU cycle may be the time taken by a microcontroller to execute a processor operation and may be equivalent to the reciprocal of the clock rate of the embedded system.

Finer time granularity provided by the improved RTOS implementation described herein can mean that the timing needs of an application running on an embedded system can be met with better accuracy and precision when compared to typical RTOS implementations. For example, the improvement over typical RTOS implementations can be measured in orders of magnitude (e.g., three orders of magnitude, four orders of magnitude, five orders of magnitude, etc.).

This improvement may allow scheduling in the improved RTOS implementation described herein to be used in many situations in which scheduling previously could not be used in typical RTOS implementations because of the coarse time resolution provided by typical RTOS implementations. For example, there are many situations in which delays between 5 and 100 microseconds are requested by tasks or subroutines, but cannot be achieved by typical RTOS implementations that are tick-based systems. However, delays between 5 and 100 microseconds can be achieved with the cycle-based scheduling described herein.

An RTOS implementation that implements the cycle-based scheduling described herein can provide several technical benefits. For example, delays of any kind can be specified in smaller units, such as microseconds, CPU clock cycles, nanoseconds, and/or the like. Because these units can be passed as integers, higher unit resolution can result in higher delay accuracy. As another example, the increased unit resolution allows the improved RTOS implementation described herein to use timed delays where timed delays could not be used previously. As another example, delays may now be more accurate. In typical RTOS implementations, the API function delay(10), when called, may suspend operation of a thread for a time between 9 and 10 ms depending on how far away the next system tick of the embedded system is. In an RTOS implementation that implements cycle-based scheduling, such as the implementation described herein, the API function delay_ms(10), when called, may suspend operation of a thread for a time that is exactly or nearly exactly (e.g., within 1%, 2%, 3%, etc. of) 10 ms. As another example, cycle-based scheduling may not result in periodic interrupt generation, which can waste computational resources and/or consume excess power. Rather, an RTOS implementation that implements cycle-based scheduling, such as the implementation described herein, may cause a hardware timer to generate an interrupt in response to a specific API function being called (e.g., delay_ms(t)). In other words, the RTOS implementation that implements cycle-based scheduling described herein may cause a hardware timer to generate an interrupt when a time-based action is needed. Thus, the CPU core of the microcontroller of the embedded system that implements the RTOS implementation with cycle-based scheduling described herein can perform other tasks and/or enter a rest mode to preserve energy in situations in which generation of an interrupt is not needed or desired.

As used herein, the terms "real time" and "near-real time," in addition to having their ordinary meaning, are often used herein to describe operations or actions performed sufficiently fast so as to avoid introducing perceptible delay into the operation of the embedded system, and may but need not mean "immediately" or "instantaneously." In addition, as used herein, in addition to having their ordinary meaning, the terms "software" and "firmware" may be used interchangeably. Further, while some example functionality is described herein with respect to the C programming language, the features described herein are not so limited. Rather, any programming language may be used to implement the features described herein.

The foregoing aspects and many of the attendant advantages of this disclosure will become more readily appreciated as the same become better understood by reference to the following detailed description, when taken in conjunction with the accompanying drawings.

Example Embedded System with an RTOS that Implements Cycle-Based Scheduling

FIG. 1 illustrates an example operational environment 100 that includes an embedded system 120 that runs an RTOS implementation with cycle-based scheduling. As illustrated in FIG. 1, the embedded system 120 includes one or more hardware timers 121, an optional counter 122, memory 123, one or more CPUs 125, and optionally other hardware 126 like input/output (I/O) ports, timers, data storage devices, sensors, and/or the like.

An RTOS implementation that implements cycle-based scheduling may be loaded into the memory 123 of the embedded system 120 and may be executed by a single CPU 125 or multiple CPUs 125 of the embedded system 120 (e.g., symmetrical multi processing). The RTOS implementation that implements cycle-based scheduling and executed by the CPU 125 may be referred to herein as the "improved RTOS" or the "RTOS executed by the CPU 125." The CPU 125 may also be referred to herein as a processor, a hardware processor, a processing core, and/or the like. The CPU 125 may be configured with computer-executable instructions that, when executed by the CPU 125, cause the CPU 125 to perform some or all of the operations described herein. The RTOS executed by the CPU 125 may allow one or more threads to run concurrently. A thread may be a "thread of execution" of a program. These threads may execute quasi-simultaneously, even if the embedded system 120 on which the threads are run has a single CPU 125. The CPU 125 can execute the threads concurrently in at least one of two ways: time-slicing or priority-controlled scheduling.

If the CPU 125 implements time-slicing (e.g., also known as "round-robin" scheduling), the CPU 125 executes some or all threads (that are ready for executing, though not blocked for any reason) for a certain amount of time (e.g., the time slice). After that, the CPU 125 executes the next thread for a certain period of time (typically the same amount of time). In this way, some or all threads share the CPU 125 equally. As an example, a time slice may be a millisecond or a multiple of milliseconds.

One issue of time slicing is that it can take a number of time slices (e.g., a few milliseconds, tens of milliseconds, etc.) for a particular task to execute. This delay may not be critical for a task that renders and/or displays a user interface (UI), where the user may not notice a 10 millisecond delay in response. On the other hand, it can be more critical for a task like a network stack that can operate in a separate thread to have a lower delay. If the network stack is not able to achieve the lower delay, then it may not be possible for the network stack to perform certain operations.

Priority-controlled scheduling may overcome the technical deficiencies of time slicing by providing more time-critical tasks with a higher priority than less time-critical tasks. For example, the UI task described above may have a lower priority than the network stack task. The network stack task can wait for an event, such as an event triggered by an interrupt. An interrupt may be triggered by an interrupt service routine (ISR) when a packet is received by the embedded system 120. When the interrupt is triggered, the RTOS executed by the CPU 125 can immediately or nearly immediately activate the network stack task, and the network stack test can then process and react to the incoming packet.

The RTOS executed by the CPU 125 may implement time-slicing scheduling, priority-controlled scheduling, and/or a combination of time-slicing and priority-controlled scheduling. For example, the RTOS may use priority-controlled scheduling for tasks that run at different priorities and time-slicing scheduling for tasks that run at identical priorities.

Typical RTOS implementations use one hardware timer configured to generate periodic interrupts, generally once every millisecond. In an embodiment, the RTOS that implements the cycle-based scheduling and executed by the CPU 125 can operate using two or more hardware timers 121. For example, in an embodiment in which multiple hardware timers 121 are present, a first hardware timer 121 can increment (or decrement) a cycle count value (e.g., CycleCnt) every CPU 125 cycle and can be used by the RTOS for long-term accuracy. The first hardware timer 121 can run in a continuous mode, but may not generate interrupts. Rather, the first hardware timer 121 can periodically increment (or decrement) the cycle count value, which can be used by the RTOS as a time base to calculate the current embedded system 120 time in CPU 125 cycles.

A second hardware timer 121 can be programmed by the RTOS to generate an interrupt after a defined time. For example, the second hardware timer 121 can increment or decrement a count value at a specified frequency and can operate in a single-shot mode, meaning that the second hardware timer 121 counts down to 0 or up to its counter limit and generates a single interrupt once 0 or the counter limit is reached.

Alternatively, the RTOS that implements the cycle-based scheduling and executed by the CPU 125 can operate using a single hardware timer 121. The single hardware timer 121 can increment (or decrement) every CPU 125 cycle, run in a continuous mode, can be used for long-term accuracy, and can generate one or more interrupts. Thus, the functionality of the first and second hardware timers 121 described above can be combined into a single hardware timer 121.

While the present disclosure describes that a hardware timer 121 can run in a continuous mode and increment (or decrement) a cycle count value, this is not meant to be limiting. For example, the hardware timer 121 can implement the functionality of a counter (e.g., counter 122) by periodically incrementing (or decrementing) the cycle count value every CPU 125 cycle for long-term accuracy. As another example, a counter 122 separate from a hardware timer 121 can implement the counter functionality described above. In this embodiment, no hardware timer 121 may run in a continuous mode. Rather, the separate counter 122 may run in the continuous mode and provide long-term accuracy by incrementing (or decrementing) the cycle count value.

In an embodiment, the cycle count value is a 64-bit value. An overflow of the 64-bit cycle count value could occur, but the overflow would happen after $2^{64}$ CPU 125 cycles (assuming a 1 GHz clock), which is approximately 585 years if the system is powered-on and running continuously. If an overflow that happens after approximately 585 years is problematic, the RTOS executed by the CPU 125 can be configured to overcome the issue. For example, the CPU 125 can be configured to use a slower clock source (e.g., a clock with a speed less than 1 GHz, such as 100 MHz). If, for example, the CPU 125 uses a 100 MHz clock, the overflow would occur after approximately 5850 years. As another example, the least significant bits of the hardware timer 121 can be ignored. If 28 bits of the hardware timer 121 are used instead of all 32 bits of the hardware timer 121, the frequency observed by the RTOS executed by the CPU 125 can be reduced by a factor of 16, which results in an overflow occurring after approximately 9,360 years. As another example, the overflow can be handled by the RTOS executed by the CPU 125. As an illustrative example, the RTOS can be written to account properly for the overflow (e.g., maintain a count value that represents the previous value of the cycle count value and a second count value that is incremented each time a current value of the cycle count value is less than the previous value of the cycle count value, where the second count value represents the number of overflows).

A counter value representing the number of time ticks (e.g., interrupts) since the embedded system 120 started (e.g., TickCnt) present in typical RTOS implementations is optionally eliminated in the RTOS executed by the CPU 125. In typical RTOS implementations, it was occasionally useful to obtain the system time in milliseconds to display in a network (e.g., web) interface or for use in short loops with timeouts. With the RTOS executed by the CPU 125 that implements cycle-based scheduling, it may not be necessary to display system time in a network interface because there is no longer a fixed 1 millisecond system tick. As described herein, a hardware timer 121 may still generate interrupts, but the interrupts are not necessarily periodic. Instead, the hardware timer 121 may be a single-shot timer that is programmed to generate an interrupt exactly when needed by a task, scheduler, and/or the like.

While the counter value representing the number of time ticks can be eliminated in the RTOS executed by the CPU 125, this is not meant to be limiting. For example, the RTOS executed by the CPU 125 can still generate a periodic interrupt every millisecond (or any other time unit) if desired by a user or operator of the embedded system 120. In particular, to replicate the counter value representing the number of time ticks, the RTOS can call a first API function (e.g., OS_TIME_GetCycles( ) to obtain the cycle-based time (e.g., the number of CPU 125 cycles that have occurred since the embedded system 120 began operating or was started, as indicated by the count value maintained by the second hardware timer 121 or the counter 122). The RTOS can then divide the cycle-based time by the CPU 125 cycle frequency (e.g., the number of CPU 125 cycles in a time unit, such as a millisecond). As an illustrative example, in a 600 MHz embedded system 120, the RTOS may call the first API function and divide the resulting value by 600000 to obtain a time value in milliseconds that represents the number of time units that has passed since the embedded system 120 began operating or was started. Alternatively or in addition, the RTOS executed by the CPU 125 can support an API function (e.g., OS_TIME_GetTime_ms( )) that, when called, returns the number of time units that has passed since the embedded system 120 began operating or was started.

As described above, the RTOS executed by the CPU 125 can support one or more API functions available for use in typical RTOS implementations. For example, API functions supported by typical RTOS implementations may behave in the same manner as in typical RTOS implementations when called by the RTOS executed by the CPU 125. As an illustrative example, the API function OS_Delay( ), which is supported by typical RTOS implementations and results in millisecond-aligned timing, when called by the RTOS executed by the CPU 125 may still result in the same millisecond-aligned timing. Thus, the timing of an application originally run on an embedded system with a typical RTOS and that is migrated to an embedded system 120 running the improved RTOS may not change.

In addition, the RTOS executed by the CPU 125 can support one or more additional API functions that are not supported by a typical RTOS. For example, the RTOS executed by the CPU 125 can support OS_Delay_ms( ), OS_delay_us( ), OS_Delay_Cycles( ), and/or any other API function that, when called, waits for a time period specified in time units or CPU 125 cycles and transitions a task from one state to another (e.g., from a WAITING state to a READY state) after the time period expires. OS_Delay_ms( ) may be a function that, when called, suspends the calling task, waits for a time period specified in milliseconds, and transitions the task from one state to another (e.g., from a WAITING state to a READY state) after the time period expires. OS_Delay_us( ) may be a function that, when called, suspends the calling task, waits for a time period specified in microseconds, and transitions the task from one state to another (e.g., from a WAITING state to a READY state) after the time period expires. OS_Delay_Cycles( ) may be a function that, when called, suspends the calling task, waits for a time period specified in CPU 125 cycles, and transitions a task from one state to another (e.g., from a WAITING state to a READY state) after the time period expires. Some or all of these additional API functions may allow for more accurate timing for the reasons explained herein. Overall, by supporting API functions supported by typical RTOS implementations and additional API functions not supported by typical RTOS implementations, the RTOS executed by the CPU 125 can provide the same level of accuracy as a typical RTOS for an application that uses API function(s) supported by typical RTOS implementations and the improved RTOS and can provide more accurate timing than a typical RTOS for an application that is modified to use one or more of the additional API functions.

The CPU 125 may be any hardware processor and may include a single core or multiple cores. In some embodiments, the embedded system 120 may include multiple discrete CPUs 125. The memory 123 may include random access memory (RAM) and/or read-only memory (ROM). In the depicted embodiment, the memory 123 includes one or more real-time programs 124 (or optionally one or more programs that do not run in real time). In one embodiment, the programs 124 are stored in ROM. The programs 124 may also be stored in RAM in some embodiments.

The embedded system 120 can communicate with other electronic or computing devices via a network 110. For example, the network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Example Implementation

As described above, the RTOS that implements the cycle-based scheduling described herein can be a priority-controlled (and/or time slicing) multitasking operating system designed to be used for the development and execution of real-time or near real-time applications for a variety of electronic or computing devices (e.g., embedded systems 120, computers, microcontrollers, etc.). The RTOS may be executed by the CPU 125 and may access memory 123. The RTOS is described herein as being executed by the CPU 125 of an embedded system 120 for ease of illustration. However, the RTOS can also be executed by a CPU core or multiple CPU cores of any type of electronic or computing device.

A task may be a program running on the CPU 125 of the embedded system 120. A thread may be a task that shares the same memory layout with another thread and a process may be a task with its own memory layout. The improved RTOS may allow multiple tasks to be executed on a single CPU 125 and/or multiple CPUs 125 by providing the multitasking operating system described above. The improved RTOS can schedule tasks for execution.

Interrupts generated by a hardware timer 121 may be interruptions of a program caused by the hardware timer 121. When an interrupt occurs, the CPU 125 may save its registers and execute a subroutine of the CPU 125 called an ISR. After the ISR is completed, the program may return to the highest-priority task that is ready for execution. For example, the ISR can respond to the expiration of a hardware timer 121 by determining whether a task is to be awakened and/or executed.

Unlike typical RTOS implementations that use the system tick as the time base, the improved RTOS uses CPU 125 cycles as the time base. For example, one hardware timer 121 or counter 122 may run at a specific frequency, such as at a frequency determined by the CPU 125 clock rate (e.g., the hardware timer 121 or counter 122 can increment or decrement a cycle count value every CPU 125 cycle as described above). The improved RTOS can rely on a single hardware timer 121 or multiple hardware timers 121 (and/or counters 122). In an embodiment in which the improved RTOS relies on multiple hardware timers 121 (and/or counters 122), a first hardware timer 121 may increment or decrement the cycle count value every CPU 125 cycle (instead of every system tick or every time unit) and be used for a long-term time base (e.g., can produce a cycle count value that continuously increments or decrements over the course of operation of the embedded system 120). A second hardware timer 121 may increment or decrement a count value at a specified frequency (e.g., at a frequency in time units, number of CPU 125 cycles, and/or units of system ticks specified in an API call by a task) and be used to generate one or more interrupts, such as when the count value reaches 0 or a counter limit. Expiration of the second hardware timer 121 may cause an interrupt to occur, which may cause an ISR (or other CPU 125 subroutine) to read the cycle count value maintained by the first hardware timer 121 to determine whether the cycle count value maintained by the first hardware timer 121 has reached a value that would result in a task being awakened and/or executed.

The second hardware timer 121 may be a one-shot timer that is periodically reset by the improved RTOS. For example, one or more tasks may generate an API function call specifying a timeframe within which the respective task should be awakened and/or executed. The timeframe can be specified in units of time, number of CPU 125 cycles, and/or units of system ticks, and the improved RTOS can convert the units of time and/or the units of system ticks into an equivalent number of CPU 125 cycles if the timeframe is not specified in number of CPU 125 cycles. The improved RTOS can determine which task is to be awakened first and (1) set the second hardware timer 121 to start a count value at the number of CPU 125 cycles corresponding to the API function call generated by the first task to be awakened (e.g., the number of CPU 125 cycles specified in the API function call generated by the first task to be awakened or the number of CPU 125 cycles determined to be equivalent to the units or time or the units of system ticks specified in the API function call generated by the first task to be awakened) and decrement the count value to 0 (or 1) or (2) set the second hardware timer 121 to start a count value at 0 (or 1) and increment the count value until the number of CPU 125 cycles specified in the API function call generated by the first task to be awakened is reached.

Once the count value reaches 0 (or 1) or the number of CPU 125 cycles, the first hardware timer 121 can generate an interrupt and an ISR or other subroutine of the CPU 125 can check the cycle count value of the first hardware timer 121 to determine whether the first task waiting to be awakened is to be awakened. If the first task is to be awakened, the scheduler of the improved RTOS, the first task, and/or other subroutines of the CPU 125 or improved RTOS may perform operations as a result (e.g., awaken the first task). Once these operations are complete and/or prior to the operations being complete, the improved RTOS may reset the second hardware timer 121 and determine which task is to be awakened next. The improved RTOS may then perform at least one of two actions. The improved RTOS may set the second hardware timer 121 to start a count value at the number of CPU 125 cycles corresponding to the API function call generated by the next task waiting to be awakened minus the number of CPU 125 cycles that have already passed due to the second hardware timer 121 being previously run and any operations performed by the scheduler, the first task, and/or other subroutines (e.g., the number of CPU 125 cycles specified in the API function call generated by the first task waiting to be awakened or the number of CPU 125 cycles determined to be equivalent to the units or time or the units of system ticks specified in the API function call generated by the first task waiting to be awakened minus the number of CPU 125 cycles that passed since the second hardware timer 121 was first set) and decrement the count value to 0 (or 1). Alternatively or in addition, the improved RTOS may set the second hardware timer 121 to start a count value at 0 (or 1) and increment the count value until the number of CPU 125 cycles specified in the API function call generated by the first task waiting to be awakened is reached minus the number of CPU 125 cycles that have already passed due to the second hardware timer 121 being previously run and any operations performed by the scheduler, the first task, and/or other subroutines. Once the count value reaches 0 (or 1) or the number of CPU 125 cycles, the first hardware timer 121 can generate an interrupt and an ISR or other subroutine can check the cycle count value of the first hardware timer 121 to determine whether the next task waiting to be awakened is to be awakened. This process may repeat any number of times for any number of tasks that generate an API function call as described herein.

Because the frequency at which a CPU 125 cycle occurs may be the reciprocal of the clock rate, a CPU 125 cycle may occur much more frequently than once every 1 millisecond. Because the improved RTOS relies on CPU 125 cycles as the time base, tasks running in the improved RTOS can be configured to wake up in response to an interrupt and execute at a time or frequency that is based on units or multiples of CPU 125 cycle occurrences and therefore at a finer time resolution than 1 millisecond or more frequently than once every 1 millisecond. A system tick, however, may occur at best once every 1 millisecond. Thus, tasks running in the improved RTOS can be configured to wake up and execute at a time resolution that is much finer than the time resolution provided by typical RTOS implementations that rely on the system tick as the time base. Fewer interrupts may be generated as a result, conserving CPU 125 resources and reducing power consumption.

Despite using CPU 125 cycles as the time base rather than the system tick, the improved RTOS may still be compatible with existing API functions. For example, the improved RTOS may include an API function that, when called, converts CPU 125 cycles into system ticks (assuming 1 tick every 1 millisecond) and/or returns units of system ticks; an API function that, when called, converts CPU 125 cycles into time units and/or returns the time units (e.g., milliseconds, microseconds, nanoseconds, etc.); an API function that, when called, converts time units into CPU 125 cycles and/or returns units of CPU 125 cycles; and/or the like.

Figure 2:
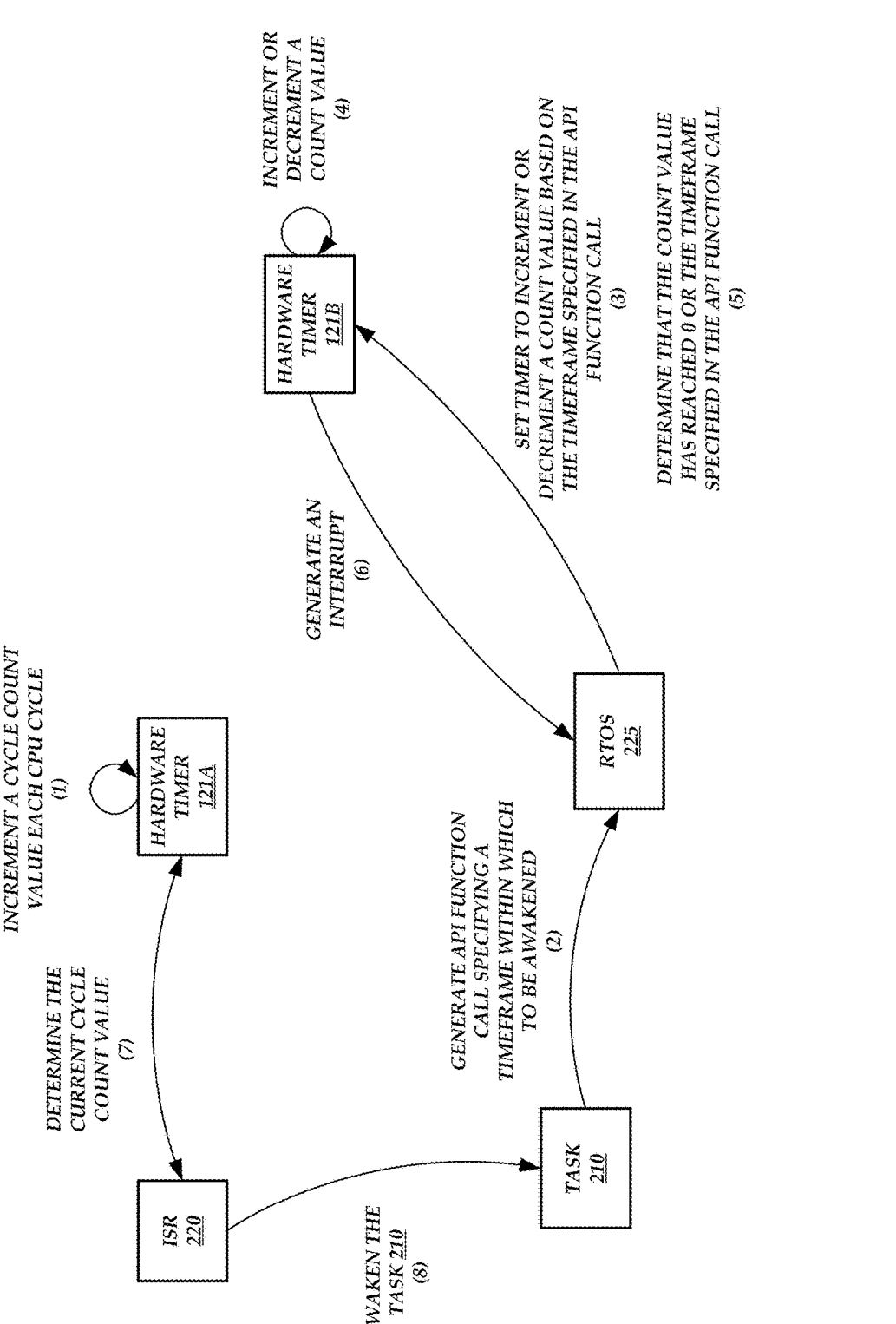
FIG. 2 illustrates example operations performed by components of the operating environment of FIG. 1 to awaken a task.

FIG. 2 illustrates example operations performed by components of the operating environment 100 to awaken a task 210. As illustrated in FIG. 2, a hardware timer 121A can increment a cycle count value each CPU cycle at (1). The hardware timer 121A may operate in a continuous mode such that the cycle count value continues to be incremented each CPU cycle regardless of the operations being performed by other components of the operating environment 100. The hardware timer 121A may also be referred to herein as the first hardware timer 121A.

The task 210 can generate an API function call that specifies a timeframe within which to be awakened at (2). For example, the timeframe can be in units of time, CPU 125 cycles, units of system ticks, and/or the like. RTOS 225 can receive the API function call and set hardware timer 121B. The hardware timer 121B may also be referred to herein as the second hardware timer 121B. In particular, the RTOS 225 can set the hardware timer 121B to increment or decrement a count value based on the timeframe specified in the API function call at (3). The count value may be incremented or decremented each CPU 125 cycle. As an illustrative example, the RTOS 225 can set the hardware timer 121B to increment the count value until the value matches the number of CPU 125 cycles specified in the API function call, until the value matches a value that would be reached when the unit of time specified in the API function call has passed, until the value matches a value that would be reached when the unit of system tick specified in the API function call has been met, and/or the like. As another illustrative example, the RTOS 225 can set the hardware timer 121B to decrement the count value until the value has been decremented a number of times that matches the number of CPU 125 cycles specified in the API function call, until the value has been decremented a number of times that matches a number that would be reached when the unit of time specified in the API function call has passed, until the value has been decremented a number of times that matches a number that would be reached when the unit of system tick specified in the API function call has been met, and/or the like. In an embodiment in which the count value is decremented, the count value is initially set to a value such that the count value reaches 0 when one of the conditions described above is met.

In response, the hardware timer 121B can increment or decrement the count value at (4). The hardware timer 121B can increment or decrement the count value each CPU 125 cycle. The RTOS 225 can monitor the count value and determine when the count value has reached 0 (e.g., in the situation in which the count value is decremented) or the timeframe specified in the API function call (e.g., in the situation in which the count value is incremented) at (5).

The hardware timer 121B can generate an interrupt at (6) when the RTOS 225 determines that the count value reached 0 or the specified timeframe. ISR 220 can determine that the interrupt has been triggered and determine current cycle count value of the hardware timer 121A at (7). If the current cycle count value indicates that a number of CPU cycles has passed that equals or exceeds the timeframe within which the task 210 is to be awakened, then the ISR 220 can awaken the task 210 at (8).

Example Cycle-Based Scheduling Routine

FIG. 3 illustrates an example cycle-based scheduling routine 300 that can be implemented by the embedded system 120 of FIG. 1. For example, the CPU 125 that runs the improved RTOS and/or other components of the embedded system 120 can execute the cycle-based scheduling routine 300. The cycle-based scheduling routine 300 begins at block 302.

At block 304, a first hardware timer is caused to increment a cycle count value each CPU cycle. For example, the first hardware timer may begin incrementing the cycle count value when the embedded system 120 in which the first hardware timer runs is started.

At block 306, an API function call is obtained from a task running on the CPU 125. For example, the API function call may specify a timeframe within which the task is to be awakened. The task may go to sleep or into a rest or waiting state after calling the API function.

At block 308, a second hardware timer is set to increment or decrement a count value each CPU cycle. For example, the manner by which the second hardware timer is set may be dependent on the timeframe specified in the API function call.

At block 310, an interrupt is generated in response to the second hardware timer expiring. For example, the second hardware timer may generate the interrupt.

At block 312, the task is awakened in response to a determination that a timeframe specified by the API function call has passed. For example, generating the interrupt may cause an ISR to check the cycle count value. The determination may be made by checking the cycle count value to determine whether the difference between a current cycle count value and a previous cycle count value (e.g., the current cycle count value when the API function was called) corresponds with (e.g., matches) the timeframe specified in the API function call. After the task is awakened, the second hardware timer may be reset for future use in awakening the task or another task, and the cycle-based scheduling routine 300 ends.

Terminology

Many other variations than those described herein can be apparent from this disclosure. For example, depending on the embodiment, certain acts, events, or functions of any of the algorithms described herein can be performed in a different sequence, can be added, merged, or left out altogether (e.g., not all described acts or events may be necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality can be implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine or hardware processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, can be generally intended to convey that certain embodiments include, while other embodiments do not include, certain features, elements and/or states. Thus, such conditional language can be not generally intended to imply that features, elements and/or states may be in any way required for one or more embodiments or that one or more embodiments necessarily include logic for deciding, with or without author input or prompting, whether these features, elements and/or states may be included or may be to be performed in any particular embodiment. The terms "comprising," "including," "having," and the like may be synonymous and may be used inclusively, in an open-ended fashion, and do not exclude additional elements, features, acts, operations, and so forth. Also, the term "or" can be used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" can be applied.

Disjunctive language such as the phrase "at least one of X, Y, or Z," unless specifically stated otherwise, can be otherwise understood with the context as used in general to present that an item, term, etc., may be either X, Y, or Z, or any combination thereof (e.g., X, Y, and/or Z). Thus, such disjunctive language can be not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be implemented within a form that does not provide all of the features and benefits set forth herein, as some features can be used or practiced separately from others.

What is claimed is:

1. A computing device comprising:
a memory device configured to store an operating system; and
a hardware processor in communication with the memory device, wherein the hardware processor is configured with computer-executable instructions that, when executed by the hardware processor, cause the hardware processor to execute the operating system and to:
  cause a first hardware timer of the computing device to increment a cycle count value each cycle of the hardware processor, wherein the first hardware timer is used for long-term time measurement;
  determine that a task running on the hardware processor has called an application programming interface (API)

function, wherein the API function specifies a timeframe within which the task is to be awakened;
  in response to the API function being called, set a second hardware timer of the computing device programmed by the operating system to decrement a count value each cycle of the hardware processor, wherein the second hardware timer is a one-shot timer;
  determine that the second hardware timer has expired;
  cause the second hardware timer to generate an interrupt;
  determine that the timeframe specified by the API function has passed using a current version of the cycle count value; and
  awaken the task.

2. The computing device of claim 1, wherein the computer-executable instructions, when executed, further cause the hardware processor to determine that the count value has reached one of zero or a value corresponding to the timeframe.

3. The computing device of claim 1, wherein the timeframe comprises one of a number of cycles of the hardware processor, a unit of time, or a unit of system tick.

4. The computing device of claim 1, wherein the operating system comprises a real-time operating system.

5. The computing device of claim 1, wherein the computing device comprises an embedded system.

6. The computing device of claim 1, wherein the operating system is compatible with an extended API, wherein the extended API comprises at least one of a first function, a second function, or a third function, wherein the first function, when called, passes a first parameter to the operating system in which a unit of ticks is specified and that directs the operating system to schedule the interrupt to trigger after a first number of cycles of the hardware processor corresponding to the first parameter has passed, wherein the second function, when called, passes a second parameter to the operating system in which a second number of cycles of the hardware processor is specified and that directs the operating system to schedule the interrupt to trigger after the second number of cycles of the hardware processor has passed, and wherein the third function, when called, passes a third parameter to the operating system in which a unit of time is specified and that directs the operating system to schedule the interrupt to trigger after a third number of cycles of the hardware processor corresponding to the third parameter has passed.

7. The computing device of claim 6, wherein the unit of time comprises one of milliseconds, microseconds, or nanoseconds.

8. A computer-implemented method comprising:
causing a first hardware timer of a computing device that comprises a hardware processor that executes an operating system to increment a cycle count value each cycle of the hardware processor, wherein the first hardware timer is used for long-term time measurement;
determining that a task running on the hardware processor has called an application programming interface (API) function, wherein the API function specifies a timeframe within which the task is to be awakened;
in response to the API function being called, setting a second hardware timer of the computing device programmed by the operating system to decrement a count value each cycle of the hardware processor, wherein the second hardware timer is a one-shot timer;
determining that the second hardware timer has expired;
causing the second hardware timer to generate an interrupt;

determining that the timeframe specified by the API function has passed using a current version of the cycle count value; and awakening the task, wherein the computer-implemented method is performed by the operating system executed by the hardware processor.

9. The computer-implemented method of claim 8, wherein determining that the second hardware timer has expired further comprises determining that the count value has reached one of zero or a value corresponding to the timeframe.

10. The computer-implemented method of claim 8, wherein the timeframe comprises one of a number of cycles of the hardware processor, a unit of time, or a unit of system tick.

11. The computer-implemented method of claim 8, wherein the operating system comprises a real-time operating system.

12. The computer-implemented method of claim 8, wherein an embedded system comprises the hardware processor.

13. The computer-implemented method of claim 8, wherein the operating system is compatible with an extended API, wherein the extended API comprises at least one of a first function, a second function, or a third function, wherein the first function, when called, passes a first parameter to the operating system in which a unit of ticks is specified and that directs the operating system to schedule the interrupt to trigger after a first number of cycles of the hardware processor corresponding to the first parameter has passed, wherein the second function, when called, passes a second parameter to the operating system in which a second number of cycles of the hardware processor is specified and that directs the operating system to schedule the interrupt to trigger after the second number of cycles of the hardware processor has passed, and wherein the third function, when called, passes a third parameter to the operating system in which a unit of time is specified and that directs the operating system to schedule the interrupt to trigger after a third number of cycles of the hardware processor corresponding to the third parameter has passed.

14. The computer-implemented method of claim 13, wherein the unit of time comprises one of milliseconds, microseconds, or nanoseconds.

15. A computing device comprising:

a memory device configured to store an operating system; and a hardware processor in communication with the memory device, wherein the hardware processor is configured with computer-executable instructions that, when executed by the hardware processor, cause the hardware processor to:

cause a first hardware timer to increment a cycle count value each cycle of the hardware processor;

determine that a task running on the hardware processor has called an application programming interface (API) function that specifies a timeframe;

in response to the API function being called, set a second hardware timer to change a count value each cycle of the hardware processor;

determine that the second hardware timer has expired;

cause the second hardware timer to generate an interrupt, wherein the operating system is compatible with an extended API, wherein the extended API comprises a first function, wherein the first function, when called, passes a first parameter to the operating system in which a unit of ticks is specified and that directs the operating system to schedule the interrupt to trigger after a first number of cycles of the hardware processor corresponding to the first parameter has passed;

determine that the timeframe specified by the API function has passed using a current version of the cycle count value; and awaken the task.

16. The computing device of claim 15, wherein the computer-executable instructions, when executed, further cause the hardware processor to determine that the count value has reached one of zero or a value corresponding to the timeframe.

17. The computing device of claim 15, wherein the timeframe comprises one of a number of cycles of the hardware processor, a unit of time, or a unit of system tick.

18. The computing device of claim 15, wherein the computer-executable instructions, when executed, further cause the hardware processor to set the second hardware timer to increment the count value each cycle of the hardware processor.

19. The computing device of claim 15, wherein the computer-executable instructions, when executed, further cause the hardware processor to set the second hardware timer to decrement the count value each cycle of the hardware processor.

20. The computing device of claim 15, wherein the operating system comprises a real-time operating system.

21. The computing device of claim 15, wherein the first hardware timer is used for long-term time measurement, and wherein the second hardware timer is a one-shot timer.

* * * * *